United States Patent Office 3,828,015
Patented Aug. 6, 1974

3,828,015
METHOD FOR PREPARING BRANCHED COPOLYMERS OF ETHYLENE WITH VINYL ORGANOSILICON MONOMERS
Sergei Mikhailovich Samoilov, Simonovsky val 8, kv. 60; Vladimir Ivanovich Ivanov, ulitsa Novatorov 40, korpus 8, kv. 41; Galina Vladimirovna Zambrovskaya, ulitsa Zemlyachki 36, kv. 20; Oleg Nikolaevich Tsvetkov, ulitsa Sakkhalinskaya 6, korpus 1, kv. 256; Viktor Nikolaevich Monastyrsky, ulitsa Vasilievskaya 9, kv. 62; Evgeny Ivanovich Bespalov, ulitsa Kievskaya 20, kv. 15; Boris Vasilievich Gryaznov, Jurievsky pereulok 22, korpus 1, kv. 73; and Boris Vladimirovich Molchanov, Pogonny proezd 3a, kv. 14, all of Moscow, U.S.S.R.
No Drawing. Filed Mar. 5, 1973, Ser. No. 338,223
Claims priority, application U.S.S.R, Mar. 3, 1972, 1756116
Int. Cl. C08f 15/04
U.S. Cl. 260—88.1 R          15 Claims

ABSTRACT OF THE DISCLOSURE

Branched copolymers of ethylene with vinyl organosilicon monomers having the general formula $$CH_2=CHSiR^1_n[OSi(R^2)_3]_{3-n}$$

wherein $R^1$ is $CH_3$, $R^2$ is $CH_3$, $C_2H_5$ or phenyl, $n$ is 0 or 1. The copolymers contain units which are expressed by the formulas $$[-CH_2-CH_2-] \text{ and } \{-CH_2-CHSiR^1_n[OSi(R^2)_3]_{3-n}-\}$$

The copolymers are prepared by copolymerizing a reaction mixture containing ethylene and the above named vinyl organosilicon monomers at a temperature from 50 to 280° C. under a pressure from 100 to 3500 atm. in the presence of initiators of free-radical polymerization.

BACKGROUND AND SUMMARY OF THE INVENTION

The present invention relates to copolymers of ethylene and more particularly to branched copolymers of ethylene with vinyl organosilicon monomers. Known in the prior art are branched copolymers of ethylene with unsaturated organosilicon monomers having the general formula $$R^1CH=CHSi(OR^2)_3$$

where $R^1$ radicals are hydrogen or fluorine-substituted alkyls, and $R^2$ are alkyls or hydrocarbon radicals with a simple ether bond (see U.S. Pat. No. 3,225,018).

Known also are branched copolymers of ethylene with vinyl organosilicon monomers having the general formula $$CH_2=CHSiR_3$$

where R is hydrogen or alkyl, benzyl or tolyl radicals (see U.S. Pat. No. 3,577,399).

Said copolymers are prepared by copolymerizing ethylene with unsaturated organosilicon monomers under a pressure to 500 atm. in the presence of initiators of the free-radical type.

Branched copolymers of ethylene with unsaturated organosilicon monomers have various specific and useful properties, such as, for example, good water-repelling property, increased thermal stability and antistatic properties. For example, they can be used for imparting water-repelling properties to various materials. The specific useful properties of the branched copolymers of ethylene with unsaturated organosilicon monomers are improved with increasing concentration in them of silicon, which can be attained by increasing the concentration of unsaturated organosilicon monomer units in them.

At the same time, with increased concentration of the organosilicon monomer units in the copolymers, some other useful properties, such as tensile strength, specific elongation at break, the melting point, the dielectric constant, are impaired. The molecular weight of the copolymer decreases with increased content in the copolymers of the organosilicon monomer units. For example, known branched copolymers, of ethylene containing more than 15 mole percent of unsaturated organosilicon monomer units, have the molecular weight of only 2000, which also deteriorates some properties of the copolymers.

For this reason, in some cases, the combination of the above named useful properties in the known branched copolymers of ethylene with unsaturated organosilicon monomers has proved impracticable.

These disadvantages of the known branched copolymers of ethylene with unsaturated organosilicon monomers are due to the fact that only one atom of silicon is contained in each organosilicon monomer unit.

The object of the invention is to eliminate these disadvantages in the known branched copolymers of ethylene with unsaturated organosilicon monomers.

It is a specific object of the invention to prepare branched copolymers of ethylene with unsaturated organosilicon monomers which will possess better water-repelling and other useful properties (as compared with the known copolymers of ethylene) and which will also display other useful properties, for example, good tensile strength and specific elongation.

The above objects have been attained in branched copolymers of ethylene with vinyl organosilicon monomers, characterized, according to the invention, by the general formula $$CH_2=CHSiR^1_n[OSi(R^2)_3]_{3-n},$$

where $R^1$ is $CH_3$, $R^2$ are radicals selected from the group consisting of $CH_3$, $C_2H_5$ and phenyl, and $n$ is 0 or 1.

According to the present invention, each unit of the organosilicon monomers of the branched copolymers of ethylene with vinyl organosilicon monomers contains 3 or 4 silicon atoms.

The $R^1$ radicals are saturated aliphatic radicals with a straight or branched chain having the number of carbon atoms from 1 to 12. As the length and also the degree of branching of the $R^1$ radical increases, the solubility of the copolymers increases too. However, practically available at the present time are only compounds where $R^1$ is methyl, since they can be prepared from readily available raw material vinylmethyldichlorosilane.

The $R^2$ radicals are similar, or different, saturated radicals, which can be aliphatic radicals with straight or branched chain having the number of carbon atoms from 1 to 6, and also phenyl, or phenyl, substituted in one or several positions with aliphatic radicals with a straight or branched chain having the number of carbon atoms from 1 to 4.

The solubility of the copolymers increases with the length and the degree of branching of the aliphatic radicals. However, practically available are only vinyl organosilicon monomers, in which the $R^2$ radicals are identical and are $CH_3$, $C_2H_5$ or phenyl. The use of a compound, in which $R^2$ is phenyl, as the monomer is reasonable only in cases where good thermal stability in the copolymers is required. The copolymers consist of ethylene units $$[-CH_2-CH_2-]$$

and the units of silicoorganic monomer $$\{-CH_2-CHSiR^1_n[OSi(R^2)_3]_{3-n}\}$$

where $R^1$ is $CH_2$, $R^2$ is $CH_3$, $C_2H_5$ or phenyl, and $n$ is 0 or 1. The content of the organosilicon monomer units is about 0.05–60 mole percent, and the properties of the copolymers depend on their content as follows. The organosilicon units of the copolymers are not reactive, and, in particular, all copolymers according to this invention, do not form spatial cross-linked structure. The copolymers containing from 0.5 to 5 mole percent of the organosilicon monomer units have a tensile strength of about 150 kg./sq. cm., a yield point of about 75 kg./sq. cm., a specific elongation at tension of not less than 400 percent, a dielectric constant of not more than 2.5, a wetting angle (water) of about 140° C., a melting point of not less than 100° C. and a solubility in hydrocarbon solvents at 50° C. of not less than 5 percent. The copolymers, the composition of which falls within this range may have the tensile strength of 250–300 kg./sq. cm. and specific elongation of 700–900%. In copolymers containing the organosilicon monomer units of more than 5 mole percent, the molecular weight decreases to about 1000, the solubility in hydrocarbon solvents at room temperature increases to about 20 percent by weight. Copolymers containing more than 10 mole percent of the organosilicon monomer units form emulsions in water that persist long storage.

A copolymer that offers good prospects, is the copolymer of ethylene with vinyl organosilicon monomer tris(trimethylsiloxy)vinylsilane, having the formula $$CH_2=CHSi[OSi(CH_3)_3]_3$$

Of all copolymers according to this invention, the branched copolymers of ethylene with the monomer $$CH_2=CHSi[OSi(CH_3)_3]_3$$

contain organosilicon monomer units with the greatest quantity of silicon, namely 35 percent by weight. The branched copolymers of ethylene, containing from 0.8 to 4 mole percent of tris(trimethylsiloxy)vinylsilane, have the tensile strength of about 200 kg./sq. cm., yield point of about 85 kg./sq. cm., specific elongation at tension of about 700 percent, melting point at about 110° C., dielectric constant of about 2.3, the molecular weight of about 30,000, solubility in hydrocarbon solvents at 50° C. of about 8 percent by weight, and water wetting angle of about 150°. As the content of tris(trimethylsiloxy)vinylsilane units in the copolymers increases to 20 mole percent, the molecular weight of the copolymers falls to about 1500, the solubility in hydrocarbon solvents at room temperature increases to 15 percent by weight, and the copolymers form stable emulsion in water.

The proposed branched copolymers of ethylene can be prepared by a method consisting in copolymerizing ethylene with vinyl organosilicon monomers under pressure at elevated temperature in the presence of initiators of the free-radical polymerization. According to the present invention, compounds having the general formula $$CH_2=CHSiR^1_n[OSi(R^2)_3]_{3-n}$$

where $R^1$ is $CH_3$, $R^2$ is a radical selected from the group consisting of $CH_3$, $C_2H_5$ and phenyl, and $n$ is 0 or 1, are used as the vinyl organosilicon monomers, and the polymerization is carried out at temperatures from 50 to 280° C. under pressure from 150 to 3500 atm.

As the pressure increases, the rate of the copolymerization of ethylene with the vinyl organosilicon monomers, and also the molecular weight of the copolymers increase too, which improves the yields and the practical properties of the copolymers obtained.

At the same time, as the pressure increases, difficulites are encountered in carrying out the process. Thus it is reasonable to accomplish the reaction of copolymerization under a pressure within the range from 100 to 3500 atm., the optimum pressure of the reaction being from 150 to 1800 atm.

The dependence of the copolymerization rate, the molecualr weight of the copolymer, its branching degree, and the other properties of the copolymers on the process temperature is such that the synthesis of the copolymers should preferably be carried out at temperatures from 50 to 280° C., optimum properties being obtained at temperatures of the copolymerization process from 130 to 250° C.

The composition of the copolymers depends on the content of the organosilicon monomer units in the reaction mixture in such a manner that in order to prepare polymers containing the organosilicon monomer units from 0.05 to 60 mole percent, the reaction mixture should contain about 0.1 to 80 mole percent of vinyl organosilicon monomers.

Any initiators of the free radical-type polymerization, can be used to initiate the copolymerization of ethylene with vinyl organosilicon monomers. The activity of the initiators depends on the process temperature in such a way that the most effective initiators are peroxides of the following structure: di-tert.-butyl peroxide, tert.-butyl perbenzoate, lauryl peroxide, benzoyl peroxide, enanthyl peroxide, cumene hydroperoxide, and also dinitrile azoisobutyrate. Tris(trimethylsiloxy)vinylsilane, according to the invention, is the monomer which offers good prospects in preparing branched copolymers according to the invention. This monomer is prepared (by condensation) from readily available industrial products such as vinyltrichlorosilane and trimethylchlorosilane. Tris(trimethylsiloxy)vinylsilane is a sufficiently active monomer and at its concentration in the reaction mixture to 5 mole percent, the rate of copolymerization does not decrease, and the content of tris(trimethylsiloxy)vinylsilane in the copolymer is approximately the same as in the reaction mixture.

The free radical character of the copolymerization process, which is effected in the presence of initiators of the free radical type, accounts for the branched structure of the copolymers of ethylene with vinyl organosilicon monomers.

Branched copolymers of ethylene prepared according to the invention, differ in their structure from linear and more high-molecular copolymers of ethylene with vinyl organosilicon monomers, which are prepared on organometallic catalysts by the process with the ionic mechanism.

The copolymerization is effected without any solvents or in a solution of organic compounds such as benzene, xylene, toluene, chlorobenzene, heptane, and others.

Ethylene containing oxygen in the amount of not more than 0.001 percent by volume is used for the copolymerization process.

Vinyl organosilicon monomers and the initiator, or vinyl organosilicon monomers, the initiator, and an organic solvent (if the copolymerization process is accomplished in solution) are loaded into an autoclave in a stream of ethylene.

Vinyl organosilicon monomers and ethylene are taken in the ratio of 0.1–80 mole percent to 99.9–20 mole percent respectively.

The reaction of copolymerization continues for 3–720 minutes. During the reaction, the pressure and the temperature are maintained constant to an accuracy of ±50 atm. and ±2° C. As soon as the copolymerization reaction is over, the reaction mixture is unloaded from the autoclave through a system of traps, in which the polymer products are collected. These products are used crude, or are purified from non-reacted vinyl organosilicon monomer and mechanical admixtures.

The purification is effected by re-precipitation from organic solvents into acetone, ethyl alcohol, methyl alcohol or some other precipitating agents. The precipitate is separated on a filter or a centrifuge, dried to constant weight at room temperature and a residual pressure of not more than 1–2 mm. Hg.

In the proposed organosilicon copolymers of ethylene, the specific useful properties of the silicoorganic products are combined with many useful properties of ethylene polymers. Units of the organosilicon monomers in these copolymers contain 3 or 4 silicon atoms, and contain therefore much silicon at a relatively low concentration of the silicoorganic units.

As a result, the proposed high-molecular copolymers, alongside with the increased water-repellent properties, possess also the tensile strength of not less than 150 kg./sq. cm., the specific elongation of not less than 400 percent. These copolymers cannot be cross-linked and for this reason can be readily worked into various articles by extrusion and hot moulding, and also are readily soluble in organic solvents.

Low-molecular organosilicon copolymers of ethylene yield stable at room temperature solution in hydrocarbon solvents, and emulsions in water, and can be applied to surfaces of various materials from solutions or emulsions.

DESCRIPTION OF THE PREFERRED EMBODIMENTS

For a better understanding of the invention, Examples of its practical embodiment are given by way of illustration.

Example 1

A solution of 0.008 g. of di-tert.-butyl peroxide in 26.3 g. of tris(trimethylsiloxy)vinylsilane $$CH_2=CHSi[OSi(CH_3)_3]_3$$

was charged in a stream of ethylene into a shaking autoclave having a capacity of 437 cubic centimeters and preheated to a temperature of 160° C. Ethylene containing 0.0007 percent by volume of oxygen was used. The autoclave was blown through with ethylene to increase the concentration of oxygen to 0.0009 percent by volume. The pressure of ethylene was raised to 1400 atm. and the process of copolymerization was continued for thirty minutes at a temperature of 160° C. The pressure in the autoclave was maintained at the specified level during the entire process by adding ethylene after each drop in the pressure by 50 atm. The content of tris(trimethylsiloxy)vinylsilane in the mixture of the monomers was 1.2 mole percent. As soon as the copolymerization process was over, the reaction mixture was unloaded from the autoclave through a system of traps. The yield of the copolymer was 50.4 g. The product was purified by dissolving at a temperature of 100° C. in 4 litres of xylene, by filtering the solution at a temperature of 85° C., with subsequent precipitating the copolymer in 15 litres of acetone at room temperature. The precipitate was separated on a filter and dried to constant weight at a temperature of 20° C. and residual pressure of 1–2 mm. Hg. The yield was 42.0 g. of a white solid substance, soluble in benzene, xylene, toluene and trichloroethylene.

The properties of the product were as follows: the content of tris(trimethylsiloxy)vinylsilane in the copolymer was 1.6 mole percent, or 15.5 percent by weight, the intrinsic viscosity in Tetralin at 130° C. was 0.84, in Decalin at 100° C., 0.90, the density was 0.920 g./cc., the tensile strength 276 kg./sq. cm., the yield point at 72 kg./sq. cm., the specific elongation at tension 580 percent, the water wetting angle, 143° C.

The branched polyethylene which had been synthesized in similar conditions but without tris(trimethylsiloxy)vinylsilane in the reaction mixture (the initiator was introduced into the autoclave in solution in 4 ml. of n-heptane) had the following properties: the intrinsic viscosity in Tetralin at 130° C. 1.30, in Decalin at 100° C. 1.55, the density 0.922 g./cc., the tensile strength 170 kg./sq. cm., the yield point 95 kg./sq. cm., the specific elongation 490 percent, the wetting angle 104°.

Example 2

The copolymerization of ethylene with tris(trimethylsiloxy)vinylsilane was carried out as described in Example 1. The concentration of tris(trimethylsiloxy)vinylsilane in the mixture of the monomers was 8.8 g. (0.4 mole percent), the quantity of di-tert.-butyl peroxide was 0.0004 g. The yield of the product after re-precipitation was 5.3 g. The copolymer was a pale grey substance containing 0.8 mole percent, or 9.3 percent by weight, of tris(trimethylsiloxy)vinylsilane. It had the following properties: the intrinsic viscosity in Tetraline at 130° C. was 1.15, in Decalin at 100° C. 1.35, the density 0.925 g./cc., the tensile strength 254 kg./sq. cm., the yield point 98 kg./sq. cm., the specific elongation 510 percent, the wetting angle 135°.

Example 3

Ethylene was copolymerized with tris (trimethylsiloxy) vinylsilane by a procedure described in Example 1. The content of tris(trimethylsiloxy)vinylsilane in the mixture of monomers was 3.5 mole percent (69.5 g.), the quantity of di-tert.butyl peroxide was 0.0006 g. and the yield of the product after re-precipitation was 18.0 g. The copolymer contained 4.6 mole percent, or 35.9 percent by weight of tris(trimethylsiloxy)vinylsilane and the properties of the copolymer were as follows: the intrinsic viscosity in Tetralin at 130° C. 0.39, in Decalin at 100° C. 0.43, the tensile strength 125 kg./sq. cm., the specific elongation 635 percent, wetting angle 152°.

Example 4

Ethylene was copolymerized with 3.7 g. of the monomer $CH_2=CHSi(CH_3)[OSi(CH_3)_3]_2$ by a procedure described in Example 1.

The content of $CH_2=CHSi(CH_3)[OSi(CH_3)_3]_2$ in the reaction mixture was 0.2 mole percent, the process temperature was 55° C., the pressure 1750 atm., the reaction was continued for ten hours. Dinitrile azoisobutyrate (0.3 g.) was used as the initiating agent. The yield was 2.7 g. of a white solid product containing 0.06 mole percent of the {—$CH_2$—$CHSi(CH_3)[OSi(CH_3)_3]_2$—} units, the tensile strength was 245 kg./sq. cm., specific elongation 410 percent, and the wetting angle 140°.

Example 5

Ethylene was copolymerized with 318.5 g. of the monomer $CH_2=CHSi[OSi(C_2H_5)_3]_3$ in the conditions similar to those described in Example 1. The concentration of the $CH_2=CHSi[OSi(C_2H_5)_3]_3$ in the reaction mixture was 75 mole percent, the reaction temperature was 240° C., the pressure was 120 atm., the reaction was continued for ten minutes. Di-tert.butyl peroxide (0.45 g.) was used as the initiating agent. The yield of the product was 9.4 g. It was a grey transparent resin containing 57 mole percent of tris(triethylsiloxy)vinylsilane units. The wetting marginal angle on a glass coated with a film of the copolymer was 137°.

Example 6

Ethylene was copolymerized with 328 g. of the monomer $CH_2=CHSi[OSi(C_6H_5)_3]_3$ in solution of 130 ml. of benzene in the conditions similar to those described in Example 1. The content of tris(triphenylsiloxy)vinylsilane in the reaction mixture was 28.2 mole percent, the reaction temperature was 270° C., the pressure 3400 atm., the reaction was continued for 78 minutes. Cumene hydroperoxide (0.23 g.) was used as the initiating agent. The resultant product (14.6 g.) resembled paraffin and contained 39.7 mole percent of tris(triphenylsiloxy)vinylsilane units. The marginal wetting angle was 124°.

Example 7

Ethylene was copolymerized with 2.6 g. of the monomer $CH_2=CHSi(CH_3)[OSi(C_6H_5)_3]_2$ in solution of 10 ml. of xylene by a procedure described in Example 1. The concentration of the monomer $$CH_2=CHSi(CH_3)[OSi(C_6H_5)_3]_2$$

in the reaction mixture was 0.6 mole percent, the reaction temperature was 135° C., the pressure 100 atm., the reaction was continued for 3.5 hours. Tert.-butyl perbenzoate peroxide (0.18 g.) was used as the initiating agent. The yield of the paraffin-like product was 6.8 g. It contained 1.2 mole percent of $$\{-CH_2-CHSi(CH_3)[OSi(C_6H_5)_3]_2-\}$$

units; the marginal wetting angle was 122°.

Example 8

Ethylene was copolymerized with 204.0 g. of tris(trimethylsiloxy)vinylsilane in conditions described in Example 1. The concentration of tris(trimethylsiloxy)vinylsilane in the reaction mixture was 18.7 mole percent, the temperature of the reaction was 115° C., the pressure 2100 atm.; the reaction was continued for 90 minutes. Enanthyl peroxide, taken in the quantity of 0.2 g. was used as the initiating agent. The yield of a soft Vaseline-like product was 16.8 g. The concentration of tris(trimethylsiloxy)vinylsilane units in the copolymer was 20.4 mole percent. The marginal wetting angle on a metallic plate coated with the copolymer was 156°.

We claim:

1. A branched copolymer of ethylene with a vinyl organosilicon monomer having the general formula $$CH_2=CHSiR^1_n[OSi(R^2)_3]_{3-n}$$

where $R^1$ is $CH_3$, $R^2$ is a radical selected from the group consisting of $CH_3$, $C_2H_5$, and phenyl, and $n$ is 0 or 1, containing units expressed by the formulas $$[-CH_2-CH_2-] \text{ and } \{-CH_2-CHSiR^1_n[OSi(R^2)_3]_{3-n}-\}.$$

2. Branched copolymers according to Claim 1, in which the units $$\{-CH_2-CHSiR^1_n[OSi(R^2)_3]_{3-n}-\}$$

are contained in the quantity of 0.05–60 mole percent.

3. Branched copolymers according to Claim 2, in which the units $$\{-CH_2-CHSiR^1_n[OSi(R^2)_3]_{3-n}-\}$$

are contained in the quantity of 0.5–5 mole percent.

4. Branched copolymers of ethylene with vinyl organosilicon monomers $CH_2=CHSi[OSi(CH_3)_3]_3$ units containing units expressed by formulas $$[-CH_2-CH_2-] \text{ and } \{-CH_2-CHSi[OSi(CH_3)_3]_3-\}.$$

5. Branched copolymers according to Claim 4, in which the units $\{-CH_2-CHSi[OSi(CH_3)_3]_3-\}$ are contained in the quantity of 0.8–20 mole percent.

6. A method for preparing a branched copolymer of ethylene with a vinyl organosilicon monomer having the general formula $$CH_2=CHSiR^1_n[OSi(R^2)_3]_{3-n}$$

where $R^1$ is $CH_3$, $R^2$ is a radical selected from the group consisting of $CH_3$, $C_2H_5$ and phenyl, and $n$ is 0 or 1, which comprises copolymerizing ethylene and the vinyl organosilicon monomer under a pressure of 100–3500 atm. at a temperature of 50–280° C. in the presence of an initiator of free-radical polymerization.

7. A method according to Claim 6, in which the vinyl organosilicon monomer is $CH_2=CHSi[OSi(CH_3)_3]_3$.

8. A method according to Claim 6, in which the copolymerization process is carried out under pressure of 150–1800 atm.

9. A method according to Claim 7, in which the copolymerization process is carried out under pressure of 150–1800 atm.

10. A method according to Claim 6, in which the copolymerization process is carried out at a temperature of 130–250° C.

11. A method according to Claim 7, in which the copolymerization process is carried out at a temperature of 130–250° C.

12. A method according to Claim 6, in which the content of the vinyl organosilicon monomer in the reaction mixture is from 0.1 to 80 mole percent.

13. A method according to Claim 7, in which the content of the vinyl organosilicon monomer in the reaction mixture is from 0.1 to 80 mole percent.

14. A method according to Claim 6, in which a compound selected from the group consisting of di-tert.butyl peroxide, tert.butyl perbenzoate, enanthyl peroxide, cumene hydroperoxide, and dinitrile azoisobutyrate is employed as the initiator of the free-radical polymerization.

15. A method according to Claim 7, in which a compound selected from the group consisting of di-tert.butyl peroxide, tert.butyl perbenzoate, enanthyl peroxide, cumene hydroperoxide and dinitrile azoisobutyrate is employed as the initiator of the free-radical polymerization.

References Cited

UNITED STATES PATENTS

| | | | |
|---|---|---|---|
| 3,225,018 | 12/1965 | Zutty | 260—88.1 R |
| 3,392,156 | 7/1968 | Donaldson | 260—88.1 R |
| 3,577,399 | 5/1971 | Mortimer | 260—88.1 R |

MELVYN I. MARQUIS, Primary Examiner

U.S. Cl. X.R.

260—46.5 UA, 80 PS